(12) United States Patent
Hoogerbrugge

(10) Patent No.: US 11,720,384 B2
(45) Date of Patent: Aug. 8, 2023

(54) PROGRAM CODE PROTECTION IN A DATA PROCESSING SYSTEM

(71) Applicant: NXP B.V., Eindhoven (NL)

(72) Inventor: Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 387 days.

(21) Appl. No.: 16/893,628

(22) Filed: Jun. 5, 2020

(65) Prior Publication Data

US 2021/0382740 A1 Dec. 9, 2021

(51) Int. Cl.
| | |
|---|---|
| G06F 12/00 | (2006.01) |
| G06F 9/455 | (2018.01) |
| G06F 12/02 | (2006.01) |
| G06F 12/1018 | (2016.01) |
| G06F 12/0882 | (2016.01) |
| G06F 12/14 | (2006.01) |

(52) U.S. Cl.
CPC ...... *G06F 9/45558* (2013.01); *G06F 9/45545* (2013.01); *G06F 12/0246* (2013.01); *G06F 12/0292* (2013.01); *G06F 12/0882* (2013.01); *G06F 12/1018* (2013.01); *G06F 12/1408* (2013.01); *G06F 2009/45583* (2013.01); *G06F 2009/45587* (2013.01)

(58) Field of Classification Search
CPC ............. G06F 9/45558; G06F 9/45545; G06F 12/0246; G06F 12/0292; G06F 12/0882; G06F 12/1018; G06F 12/1408; G06F 2009/45583; G06F 2009/45587; G06F 12/1441; G06F 12/1483; G06F 2212/1032; G06F 2212/1052; G06F 2212/151; G06F 2212/651; G06F 2212/657
See application file for complete search history.

(56) References Cited

U.S. PATENT DOCUMENTS

| | | | |
|---|---|---|---|
| 9,280,491 B2 | 3/2016 | Levenglick | |
| 2009/0187697 A1* | 7/2009 | Serebrin | ............... G06F 9/455 711/6 |

(Continued)

OTHER PUBLICATIONS

Horsch, Julian et al.; "TransCrypt: Transparent Main Memory Encryption Using a Minimal ARM Hypervisor;" 2017 IEEE Trustcom/BigDataSE/ICESS; Aug. 1-4, 2017; Sydney, NSW, Australia; DOI: 10.1109/Trustcom/BigDataSE/ICESS.2017.232.

(Continued)

*Primary Examiner* — Arvind Talukdar
(74) *Attorney, Agent, or Firm* — Daniel D. Hill

(57) ABSTRACT

A method is provided in a data processing system having second level address translation (SLAT) controlled by a hypervisor. In the method, hashes of all memory pages accessible by a guest OS are stored (set S). Also, hashes of all memory pages previously accessed by the guest OS are stored (set T). When the guest OS attempts an access to a memory page having executable code for which it does not have permission, an exception is generated. A hash of the memory page is compared with the hashes of set T and set S. If there is not a match within set T, then the guest OS has never attempted the requested operation before and suspicious behavior is reported. If there is not a match within set S, the requested operation is reported as illegal. In another embodiment, the memory page may be encrypted to prevent the guest OS from reading the memory page.

19 Claims, 6 Drawing Sheets

(56) References Cited

U.S. PATENT DOCUMENTS

| | | | | |
|---|---|---|---|---|
| 2012/0324236 A1* | 12/2012 | Srivastava | ............ | H04L 9/3234 |
| | | | | 713/189 |
| 2015/0178198 A1* | 6/2015 | Pratt | ........................ | G06F 12/08 |
| | | | | 711/6 |
| 2018/0181764 A1* | 6/2018 | Huntley | .............. | G06F 9/45558 |
| 2018/0341529 A1* | 11/2018 | Kou | ........................ | G06F 21/53 |
| 2019/0042764 A1* | 2/2019 | Durham | .............. | G06F 12/1009 |
| 2020/0159667 A1* | 5/2020 | Bak | ........................ | G06F 12/109 |
| 2021/0182208 A1* | 6/2021 | Palmer | ................ | G06F 12/1491 |

OTHER PUBLICATIONS

Leon, Roee S. et al.; "Hypervisor-Based White Listing of Executables;" IEEE Security & Privacy (vol. 17, Iss. 5, Sep.-Oct. 2019); DOI: 10.1109/MSEC.2019.2910218.

Yang, Jisoo et al.; "Using Hypervisor to Provide Data Secrecy for User Applications on a Per-Page Basis;" Proceedings of the 4th International Conference on Virtual Execution Environments, VEE 2008; Mar. 5-7, 2008 Seattle, Washington; DOI: 10.1145/1346256.1346267.

* cited by examiner

PROGRAM CODE PROTECTION IN A DATA PROCESSING SYSTEM

BACKGROUND

Field

This disclosure relates generally to data processing, and more particularly, to protecting program code in a data processing system.

Related Art

A typical software system includes an operating system (OS) that manages the hardware of the system, and user applications that run on top of the OS. Technology called virtualization allows multiple operating systems to operate in parallel in a single hardware data processing system. Software that manages the multiple operating systems is called a hypervisor. The operating systems are sometimes referred to as guest operating systems, and each guest OS has its own user applications. The hypervisor virtualizes the hardware system so that the guest operating systems are not aware of other guest operating systems on the data processing system. There are various motivations to use a hypervisor. For example, the hypervisor allows resource sharing while providing safety and security to the system.

To allow virtualization of the hardware system, two levels of address translation are used. First level address translation (FLAT) is controlled by the guest operating systems, and second level address translation (SLAT) is controlled by the hypervisor. Also, the hypervisor performs read, write, and execute permission checks for memory accesses to provide a level of security to the system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
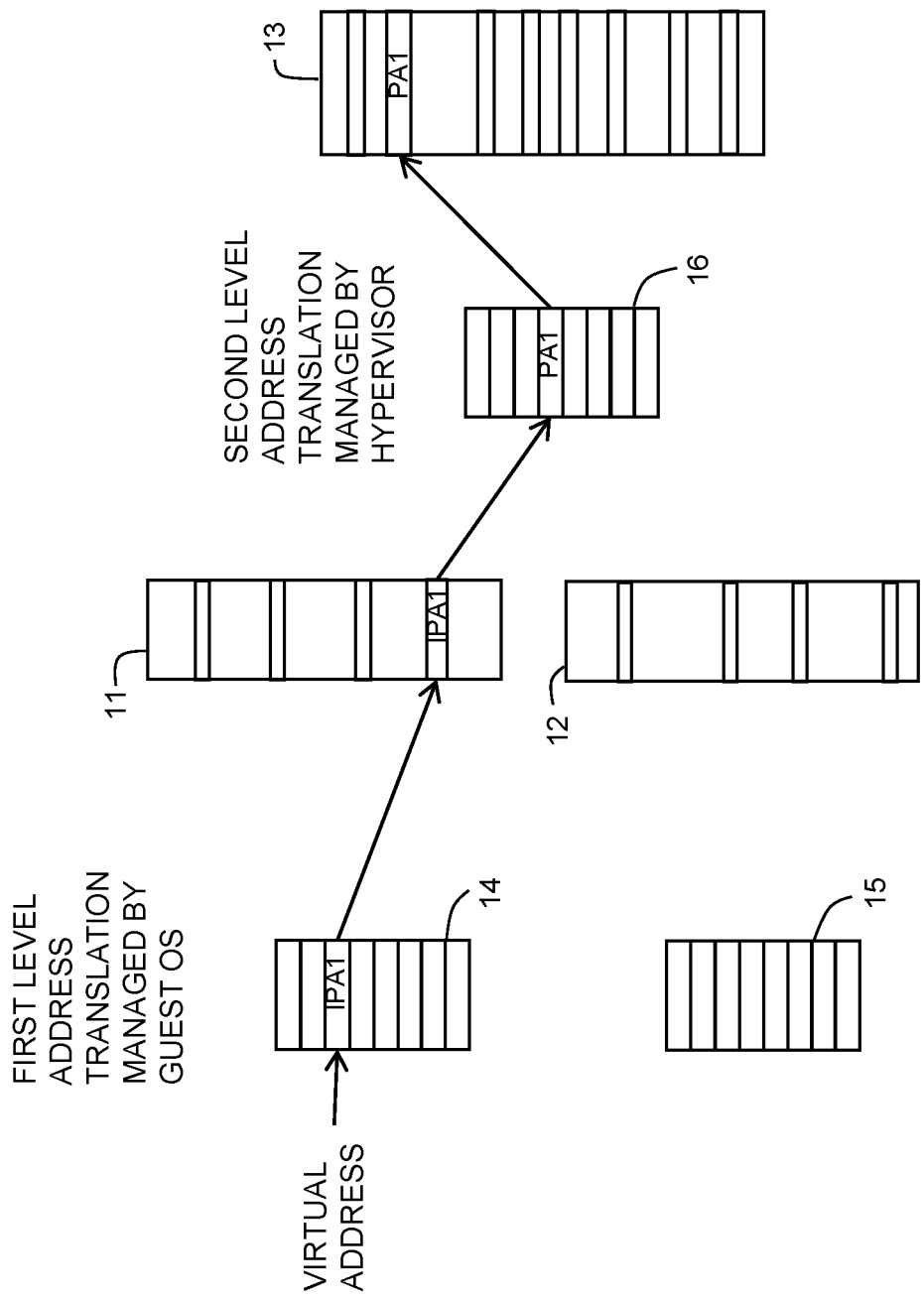
FIG. 1 illustrates two levels of address translation in a data processing system.

Generally, there is provided, a method in a virtualization system that allows a hypervisor to detect what a guest OS is doing with each memory page. In the method, hashes are collected of all memory pages of executable files in the system to produce a first hash set S. Then, hashes are collected of all the memory pages of executable files that a guest OS accesses to produce a hash set T. Hash set T is a subset of hash set S. To collect the accessed memory pages, the system is operated as it would be operated in the field. All the features and modes of the guest OS are run to try and use as much of the installed program code as possible. The two hash sets S and T are stored in the data processing system. Preferably the hash sets are stored outside the guest OS, in a location not accessible by the guest OS, so that any malicious code operating in the guest OS does not have access and cannot change the hash sets. If the guest OS attempts to access a memory page without the correct permissions, the stored hashes are checked. If the hash being checked is in set S of accessible pages, but not in set T of previously accessed pages, then the guest OS is operating differently than during development or training, and a suspicious situation is reported to an entity that can decide what action to take to protect the system. The development and training may be a training operation for a machine learning model.

Initially, SLAT access protections of all memory pages having executable code are set to readable and writeable but not executable. The hypervisor will get a first exception as soon as the guest OS executes code from a memory page for which it does not have the required execute permission. Typically, the system hardware will generate the exceptions that are received by the hypervisor and/or guest OS. At that time, the hypervisor will compute a hash over the memory page. After this, the hypervisor will change the access rights to read and execute but not write, and let the guest OS continue executing code from the memory page. By setting the access rights to read and execute, the hypervisor gives the guest OS read access rights, execute access rights, but not write access rights for this memory page. Then, the hypervisor will get a second exception when the guest OS overwrites the code in the memory page with something new. In response to the second exception the hypervisor will set the access rights back to read access, write access, but not execute access. After that the guest OS will continue with execution, and if code has been loaded into the memory page, as soon as the guest attempts to execute the code the hypervisor will again receive an exception. The hypervisor will compute a hash of the memory page for the new code that has been loaded. In this way, a memory page is used for reading/writing and for executing in an alternating manner. Exceptions are generated on a transition between these modes. In most systems, it is expected the transitions would be relatively infrequent, so the performance overhead would be relatively low.

In addition, in another embodiment, if the guest OS attempts to access a memory page without the correct permission for the operation being attempted, then the hypervisor may cause the memory page to be encrypted. Encrypting the memory page prevents the guest OS from reading program code that the guest OS wrote to the memory page, but still allow the guest OS to execute program code from the memory page.

Encrypted code execution is realized by storing code in encrypted form (e.g., AES encrypted) in the file system of the data processing system. Encrypting code in the file system keeps the code confidential from the guest OS. The SLAT access rights exception mechanism is used to detect when a memory page is accessed for the purpose of executing code. At this time, the hypervisor decrypts the memory page with a key that is present in the hypervisor but not in the guest OS. After decrypting the code page, the hypervisor changes the access permission of the memory page from read and write access to execute access so that execution of the decrypted code by the guest OS can continue. Whenever the guest OS reads or writes something to the memory page, the hypervisor receives another exception on this page. The hypervisor can then erase the plain code from the memory page or encrypt it again followed by changing the guest OS access permissions from execute to read and write. Both options (erasure and encryption) are possible. Either option prevents the guest from reading its own code. If the guest has loaded new (encrypted) code into the memory page, the hypervisor will receive an exception the next time the guest OS tries to execute the new code because the guest OS only has read and write access rights. The hypervisor will again decrypt the newly loaded encrypted code in response to the exception.

By encrypting the code, if the guest OS is compromised, the attacker is prevented from copying code out of the system and thus prevents the attacker from reverse engineering the code to determine what algorithms are implemented in the code. Also, product developers may want to keep their algorithms confidential to prevent product cloning. Keeping the code confidential by encrypting using the describe method prevents the attacker from raising privilege levels or prevents other similar ways of attacking the system. Also, a malicious guest OS is prevented from code reuse-based attacks such as the return-oriented programming (ROP) attack.

In accordance with an embodiment, there is provided, in a data processing system having a guest operating system (OS) providing first level address translation (FLAT) and a hypervisor providing second level address translation (SLAT), the hypervisor controlling read, write, and execute access rights of a plurality of memory pages of the data processing system, a method including: generating and storing a set of hashes of all memory pages accessible by the guest OS; generating and storing a set of hashes of all memory pages previously accessed by the guest OS; requesting, by the guest OS, execute access to a memory page; generating, by the hypervisor, a first exception in response to the guest OS requesting the execute access to the memory page; comparing a hash of the accessed memory page with the set of hashes of the previously accessed memory pages and determining that the hash of the accessed memory page does not match with the set of hashes of the previously accessed memory pages and in response, reporting suspicious behavior of the guest OS; and comparing the hash of the accessed memory page with the set of hashes of all accessible memory pages and determining that the hash of the accessed memory page does not match with the set of hashes of all accessible memory pages and in response, reporting illegal behavior of the guest OS. Reporting illegal behavior of the guest OS may further include withdrawing all access rights to the memory page. Initially, the guest OS may only receive read and write access rights to the memory page. Generating and storing hashes of all memory pages previously accessed by the guest OS may further include generating and storing the hashes during development of the data processing system. The method may further include requesting, by the guest OS, read or write access to the memory page; generating, by the hypervisor, a second exception in response to the guest OS requesting the write access to the memory page; encrypting or erasing the memory page in response to the second exception; and granting read or write access to the memory page. The method may further include: requesting, by the guest OS, execute access to the memory page; generating, by the hypervisor, a third exception in response to the guest OS requesting the execute access to the memory page; decrypting the memory page; and granting execute access to the memory page. The memory page may only be encrypted when the memory page includes protected code. The memory page may be used for reading/writing operations and executing operations in an alternating manner. The data processing system may be implemented as one or more integrated circuits.

In another embodiment, there is provided, a method in a data processing system having a guest operating system (OS) providing first level address translation (FLAT) and a hypervisor providing second level address translation (SLAT), the hypervisor controlling read, write, and execute access rights to each of a plurality of memory pages of the data processing system, the method including: setting access rights to a memory page to execute for the guest OS; requesting, by the guest OS, read or write access to the memory page; receiving a first exception, by the hypervisor, in response to the guest OS requesting the read or write access to the memory page; encrypting the memory page in response to the read or write access request to the memory page; and setting access rights to the memory page to read and write for the guest OS. The method may further include: requesting, by the guest OS, execute access to the memory page; receiving a second exception, by the hypervisor, in response to the guest OS requesting the execute access to the memory page; decrypting the memory page in response to the execute request to the memory page; and setting access rights to the memory page to execute for the guest OS. The method may further include: generating and storing a set of hashes of all memory pages accessible by the guest OS; generating and storing a set of hashes of all memory pages previously accessed by the guest OS; requesting, by the guest OS, execute access to the memory page; receiving a second exception, by the hypervisor, in response to the guest OS requesting the execute access to the memory page; decrypting the memory page in response to the requested execute access to the memory page; determining if the guest OS had previously accessed the memory page by checking the set of stored hashes of all memory pages previously accessed by the guest OS, wherein if the guest OS had not previously accessed the memory page, reporting suspicious behavior by the guest OS; and determining if the memory page is accessible by the guest OS by checking the set of stored hashes of all the memory pages accessible to the guest OS, wherein when the memory page is not accessible to the guest OS, reporting illegal behavior of the guest OS, and when the memory page is accessible to the guest OS, granting execute access to the memory page. Generating and storing the set of hashes of all memory pages previously accessed by the guest OS may further include generating and storing the set of hashes during development of the data processing system. Reporting illegal behavior of the guest OS may further include withdrawing all access rights to the memory page. The method may further include determining if the memory page contains protected code prior to encrypting the memory page. The method may be implemented as instructions stored in a non-transitory computer readable medium.

In yet another embodiment, there is provided, a data processing system including: a memory comprising a plurality of memory pages for storing instructions and data; and a processor coupled to the memory, the processor configured to execute instructions under management of a guest operating system (OS) and a hypervisor, wherein the guest OS provides a first level address translation between a virtual address and an intermediate physical address for a memory page in the plurality of memory pages, and the hypervisor provides a second level address translation between the intermediate physical address and a physical address of the memory page, wherein the hypervisor receives a first exception in response to the guest OS requesting read or write access to a memory page, wherein the memory page is encrypted in response to the read or write access request of the memory page, and wherein read or write access is granted to the memory page. The processor may further include the processor being configured to generate a second exception in response to the guest OS requesting execute access to the memory page, wherein the memory page is decrypted in response to the execute request to the memory page, and wherein the hypervisor grants guest OS access to the memory page. The processor may be further configured to generate and store in the memory, hashes of all memory pages accessible by the guest OS as a first set, and hashes of all memory pages previously accessed by the guest OS as a second set, wherein the hypervisor generates a third exception in response to the guest OS requesting execute access to the memory page, wherein the memory page is decrypted, the hypervisor determining if the guest OS had previously accessed the memory page by checking the stored hashes of the second set, wherein if the guest OS had not previously accessed the memory page, reporting suspicious behavior by the guest OS, and wherein the hypervisor determining if the memory page is accessible by the guest OS by checking the stored hashes of all the memory pages of the first set, wherein when the memory page being accessed is not accessible to the guest OS, reporting illegal behavior of the guest OS, and when the memory page is accessible to the guest OS, granting execute access to the memory page. The method may further include the hypervisor configured to determine if the memory page contains protected code prior to encrypting the memory page.

FIG. 1 illustrates two levels of address translation in a data processing system. In a virtualization system, multiple guest operating systems can operate in parallel in the same data processing system. A hypervisor is used to manage the resources between the multiple guest operating systems. The data processing system can be implemented such that a guest OS does not even know it is connected to a virtual machine under control of a hypervisor. A virtual memory system may be used to allocate the physical memory resources. Two levels of address translation may be used in the virtual memory system. A first level address translation (FLAT) is controlled by the guest OS and maps a virtual address (VA) to an intermediate physical address (IPA). A second level address translation (SLAT) is controlled by the hypervisor and maps the IPA to a physical address (PA).

Address translation generally happens on a memory page basis where a memory page is typically 4 Kbyte in size and pages are 4 Kbyte aligned in memory. Each VA consists of a page number and a page offset. The page number is translated via address translation and the page offset is added to the translated page number to obtain a translated memory address. In FIG. 1 guest operating systems 14 and 15 performs the FLAT to generate an IPA from a VA. The IPA is stored in memory portions 11 and 12. Then, hypervisor 16 performs the SLAT to generate a PA from the IPA to select a memory page in memory 13. As an example, a virtual address VA 1 in guest OS 14 is translated to IPA 1 and stored in a memory location in memory portion 11. Hypervisor 16 receives IPA 1 and translates IPA 1 to a physical address PA 1. Physical address PA 1 is then used to address a memory page in memory 13, or to select another resource in the data processing system.

Besides address translation functionality, FLAT and SLAT read, write, and execute permission checks are also performed during the address translation. For example, a load instruction needs the read permission of the memory page that is being read. Similarly, store instructions need write access and every instruction needs execute access. When FLAT and SLAT access rights are violated, the operating system and/or hypervisor is notified via an exception. In one embodiment, the access rights associated with the memory pages are stored in FLAT and SLAT access rights tables (not shown).

In accordance with an embodiment, hashes of all code memory pages that are executable by a guest OS are collected to produce a hash set S. The hashes may be collected as part of development and training of the data processing system during a hash collection period. The executable code pages include code in the kernel of the OS, code in device drivers (also called kernel modules), code in shared libraries, and code in user applications. All the hashes of set S are stored in a memory location of the data processing system. Memory pages are typically 4 Kbyte in size and a hash could be a SHA256 hash. The hash set S may be collected by scanning the file system of the guest OS and collecting all hashes of all memory pages of executable files in the file system.

Also, during the hash collection period, hash set T is collected and stored. Hash set T includes hashes of memory pages having code that has been executed by the guest. Hash set T is a subset of hash set S. Hash set T is collected from the system while the system is operating as it would be operated in the field. All features and modes of the system are run so as much of the installed code as possible is run. In one embodiment, hash sets S and T are stored outside the guest OS so that malicious code, if any, in the guest OS does not have access to the hash sets.

When the system is used in the field by the customer or end user and exposed to potential attacks, hashes of executed code pages are collected again. Every hash that is encountered in the field is compared with hashes in set T and set S. If the encountered hash is not in set S, then either the system has been generating/modifying its own code in the field or an attacker was able to install some malicious code in the guest OS that might harm the system. Examples of malicious code include ransomware and spyware. Assuming that code is not being self-generated or modified, the observation that the encountered hash is not in set S is a clear indication that the guest OS has been compromised. The hypervisor, or other controlling entity, should be notified so that appropriate action to prevent further damage can be taken. If self-generating/modifying code is allowed, then the parts of the system self-generating code can be excluded from the comparison with set S. Typically, the application of self-generating/modifying code in embedded systems is very limited. If the encountered hash is in set S but not in set T, then the guest OS is behaving differently in the field than the guest OS was behaving during training or development. This is a suspicious situation that can be reported to the hypervisor, or another entity that can decide what action to take, if any. Also, it may be decided that action should be taken only after multiple encountered hashes have been found to not be in set T.

In one embodiment, sets S and T are used to protect a data processing system using SLAT. Any code that an attacker might manage to install on the guest OS is detected when it is executed. If executed code is not in sets S or T, an attacker is using the system differently than the system was intended. The attacker may be using some 'corners' of the guest OS in which there are vulnerabilities known by the attacker that are exploitable. However, just because executed code in not in sets S or T does not necessarily mean the data processing system is under attack. For example, a hash being in set S but not in set T may be a result of a legitimate user using the system differently than the system was previously used by the user. However, in the typical case of normal usage, it is expected that the encountered hashes will be both in S and T.

Figure 2:
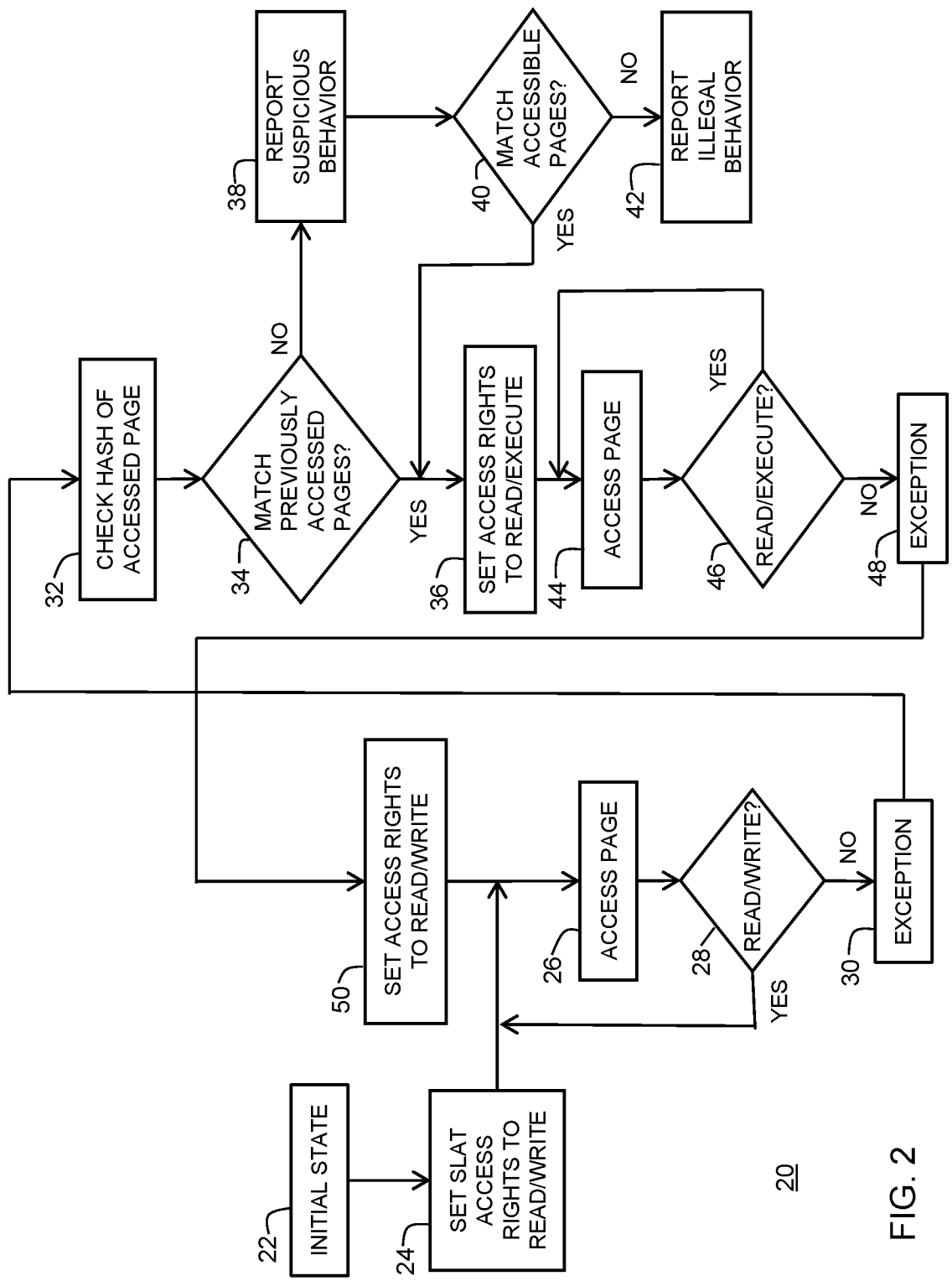
FIG. 2 illustrates a method for controlling access to a memory page in a data processing system according to an embodiment.

FIG. 2 is a flowchart of method 20 for controlling access to a memory page in a data processing system according to an embodiment. Method 20 begins at step 22. At step 22, an initial state is established in the data processing system, typically at start up or reset. At step 24, the hypervisor sets SLAT access rights to read and write for all the memory pages for a guest OS. At step 26, the guest OS requests access to a memory page in the data processing system. If the requested access is for a read or write operation, the access is allowed without intervention of the hypervisor and the YES path is taken from decision step 28 back to the beginning of step 26 where steps 26 and 28 are repeated for read and write accesses. However, if the access request is for an execute operation, the NO path is taken from decision step 28 to step 30, where an exception is generated because the guest OS does not have execute access permission. At step 32, the hash of the accessed page is checked by comparing the encountered hash with sets T and S as discussed above. At decision step 34, it is determined if the hash of the accessed memory page matches a stored hash of the set T (previously accessed pages). If the hash being checked is in the set T, then the YES path is taken from step 34 to step 36 and the guest OS access rights to the memory page are set to read and execute but not to write, and method 20 proceeds. However, if at decision step 34, the hash being checked is not in set T (set of previously accessed pages during training or development), the NO path is taken to step 38 and the suspicious behavior by the guest OS is reported because the guest OS had not accessed the request memory page before. At decision step 40, it is determined if the hash of the accessed memory page matches a hash of the set S (all accessible memory pages). If the hash of the accessed memory page does not match a hash of stored set S, then the access may be an attack and it is reported as illegal behavior. If the hash of the accessed memory page does match a hash of set S, the YES path is taken to step 36, where the access rights are set to read and execute. At decision step 46, if the access to the memory page is for a read or execute operation, the YES path is taken back to step 44 and the memory page is accessed without intervention of the hypervisor. Continued accesses to the memory page for read or execute operations are allowed. However, if at step 46 the memory page is accessed for a write access, then the NO path is taken to step 48 and an exception is generated. At step 50, the access rights to the memory page are set to allow read and write access but not execute access. The method returns to step 26 and method 20 is performed as long as memory pages are being accessed by the guest OS.

In accordance with method 20, a memory page is used for reading/writing and for executing in an alternating manner. This prevents an attacker from generating and executing new code in the data processing system. Exceptions are generated on a transition between these alternating modes. In most systems, it is expected the transitions would be relatively infrequent, so the performance overhead would be relatively low.

Figure 3:
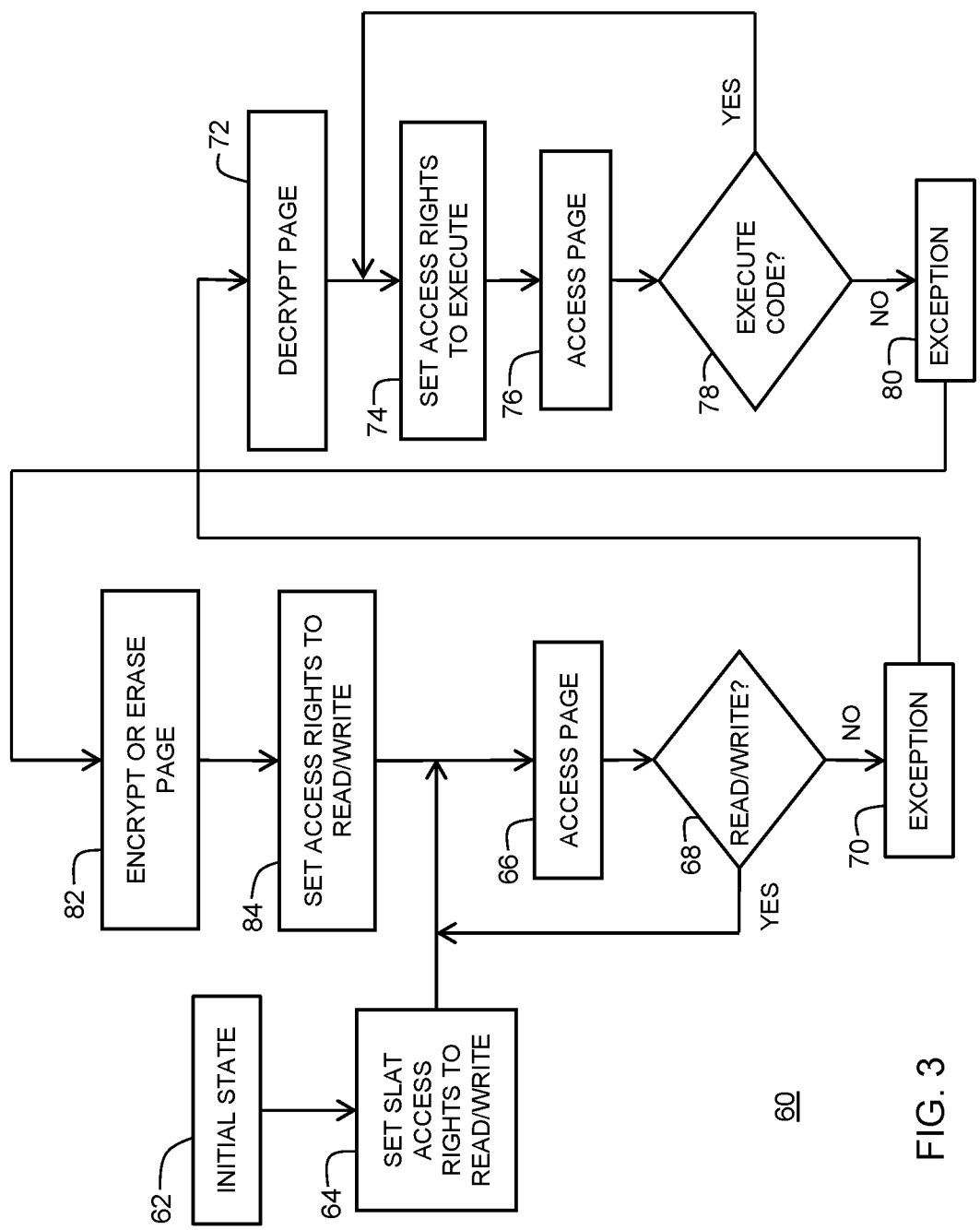
FIG. 3 illustrates a method for controlling access to a memory page in a data processing system in accordance with another embodiment.

FIG. 3 is a flowchart of method 60 for controlling access to a memory page in a data processing system in accordance with another embodiment. Method 60 begins at step 62. At step 62, the data processing system is initialized either at start-up or reset. At step 64, the SLAT access rights are set to allow read and write access. At step 66, a memory page is accessed by the guest OS. At decision step 68, if the requested access is for a read or a write operation (as set at step 64), the YES path is taken back to step 66 and the memory page is accessed. However, if the requested access is to execute code in the memory page, then the guest OS does not have execute permission and the NO path is taken to step 70 where an exception is generated. At step 72, the memory page is decrypted if the memory page had been previously encrypted. At step 74, access rights are set to execute. At step 76, the memory page is accessed by the guest OS. At decision step 78, for accesses to the memory page that are execute accesses, the steps of accessing and executing are repeated. However, if at decision step 78, the access is for a read or write access, then an exception is generated at step 80. The memory page is encrypted or erased at step 82 to prevent the guest OS from being able to read its own code. At step 84, the access rights are changed to read and write. The steps of method 60 are repeated as long as the data processing system is operating and memory pages are being accessed.

Like method 20, read/write accesses are alternated with execute accesses. By generating exceptions from changes in access requests, the activities of the guest OS can be monitored. This prevents a guest OS that may have been compromised from reading the code, which protects the code from being copied.

Figure 4:
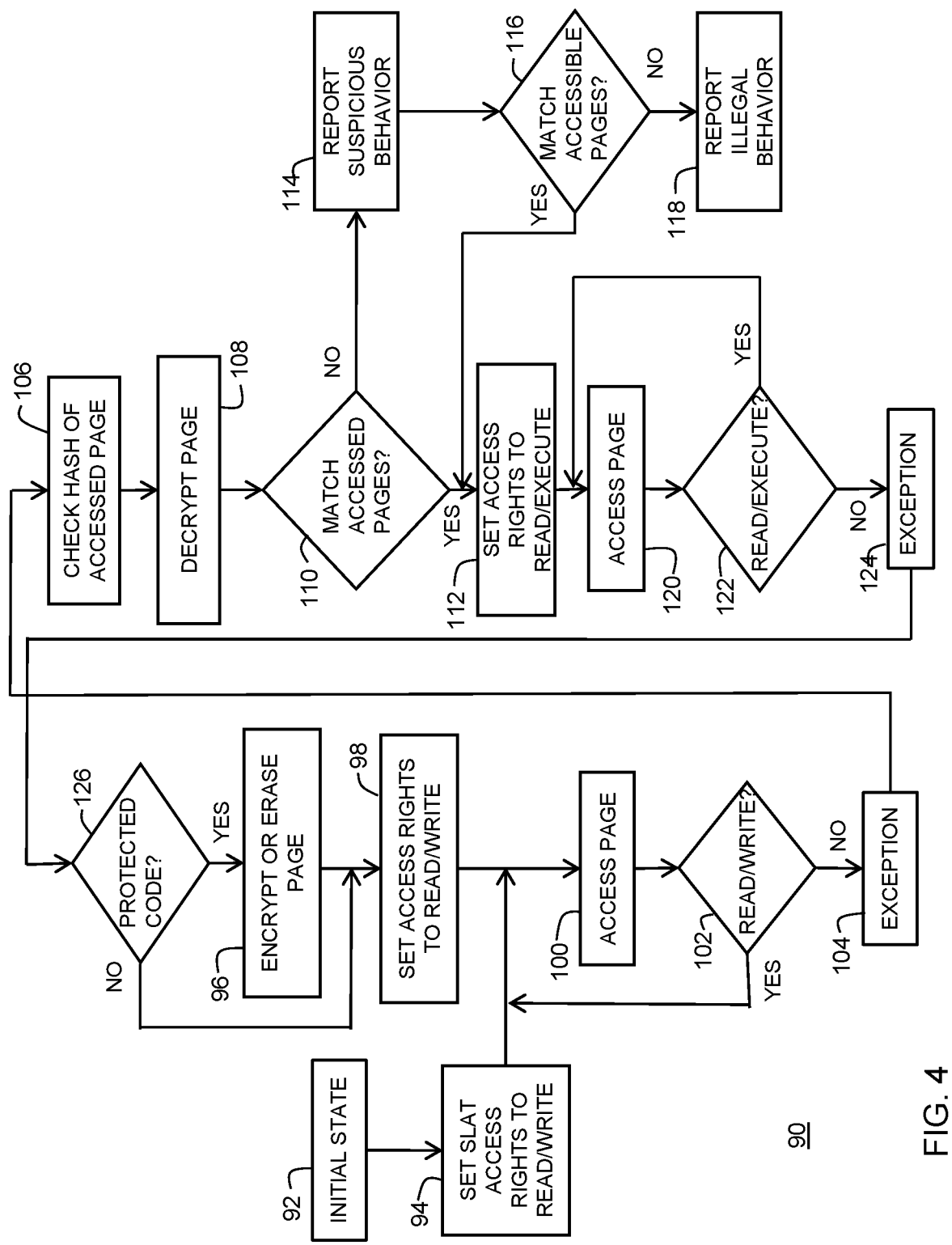
FIG. 4 illustrates a method for controlling access to a memory page in a data processing system in accordance with another embodiment.

FIG. 4 is a flowchart of method 90 for controlling access to a memory page in a data processing system in accordance with another embodiment. Method 90 combines the protections of methods 20 and 60. Method 90 begins at step 92. At step 92, the data processing system is set to an initial state, either during startup or during a reset operation. At step 94, SLAT access rights of a guest OS are set to allow read and write accesses. At step 100, a memory page is accessed by the guest OS. At decision step 102, if the access is a read or write access of the memory page, then the access is allowed, and the YES path is taken back to step 100 for another access to the memory page. If at decision step 102, the access was for an execute access, an exception is generated. At step 106, the hash of the accessed page is compared to the sets S and T as discussed above. At step 108, the memory page is decrypted. At decision step 110, it is determined if the hash matched a hash in set T. If the hash of the accessed memory page matches a hash in set T (set of previously accessed pages), then the YES path is taken to step 112, and the access rights are set to read and execute. However, if the hash of the accessed page does not match a hash in set T, then the NO path is taken to step 114, and suspicious behavior of the guest OS is reported. At decision step 116, the hash of the accessed page is compared to hash set S (the hash set of accessible pages). If the hash does not match a hash of set S, then the NO path is taken to step 118 and the access is reported as illegal behavior so that appropriate action can be taken. The appropriate action may include withdrawing all access rights to the memory page. If the hash does match one of the hashes of set S, then the YES path is taken to step 112, and the access rights are set to read and execute. At step 120, the memory page is accessed. At decision step 122, if the access is a read or execute access, the guest OS was provided the required permissions at step 112, and the YES path is taken back to step 120 and the memory page is accessed. The steps of 120 and 122 can be repeated as long the accesses are for read and execute. However, if the access is for a write operation, the NO path is taken to step 124 and an exception is generated. At decision step 126, it is determined if the code is protected code. If the code is not protected, then the NO path is taken to step 98 and the access rights are set to allow read and write accesses. However, if the code being accessed is protected code, then the YES path is taken to step 96 and the memory page is encrypted or erased to prevent the guest OS from reading the accessed code. The steps of method 90 are repeated as long as the guest OS is accessing memory pages.

Method 90 combines the advantages of both methods 20 and 60 to prevent an attacker from generating and executing new code in the data processing system and to prevent the attacker from copying the program code.

Figure 5:
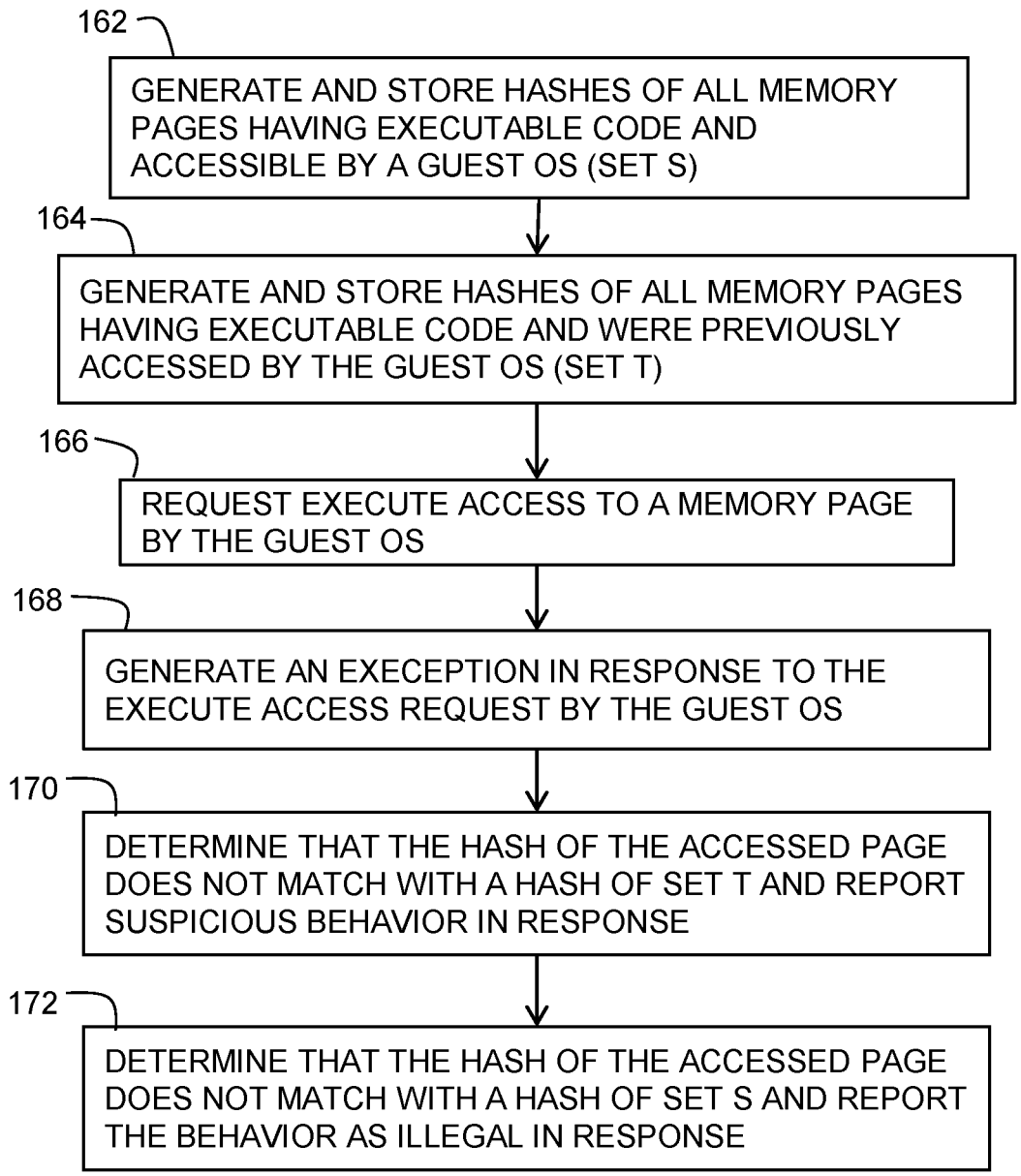
FIG. 5 illustrates a flowchart of a method in accordance with an embodiment.

FIG. 5 illustrates a flowchart of method 160 in accordance with an embodiment. Method 160 is performed in a data processing system having SLAT that is controlled by a hypervisor. The hypervisor also controls read, write, and execute access permissions for memory pages in the data processing system that include executable program code. The method begins at step 162. At step 162, hashes of all memory pages having executable code that are accessible by a guest OS (set S) are generated and stored in a memory that is not accessible by the guest OS. At step 164, hashes of all memory pages having executable code that have been accessed by the guest OS (set T) are generated and stored in a memory that is not accessible by the guest OS. In one embodiment, the sets of hashes S and T are collected during development of the data processing system. At step 166, during normal operation of the data processing system, the guest OS attempts to access a memory page to execute code. Initially, the guest OS may have only been given read and write access to the memory page. At step 168, an exception is generated in response to the access request by the guest OS. At step 170, the hash of the accessed memory page is compared with the stored hashes of memory pages accessed by the guest OS (set T). When the hash of the accessed page does not match a hash in set T, suspicious behavior is reported because the guest OS is operating differently than during development or training. At step 172, the hash of the accessed memory page is compared with the stored hashes of accessible memory pages (set S). When the hash of the accessed memory page does not match a hash in set S, then the guest OS is trying to access a memory page that is not allowed, and the illegal behavior is reported.

Figure 6:
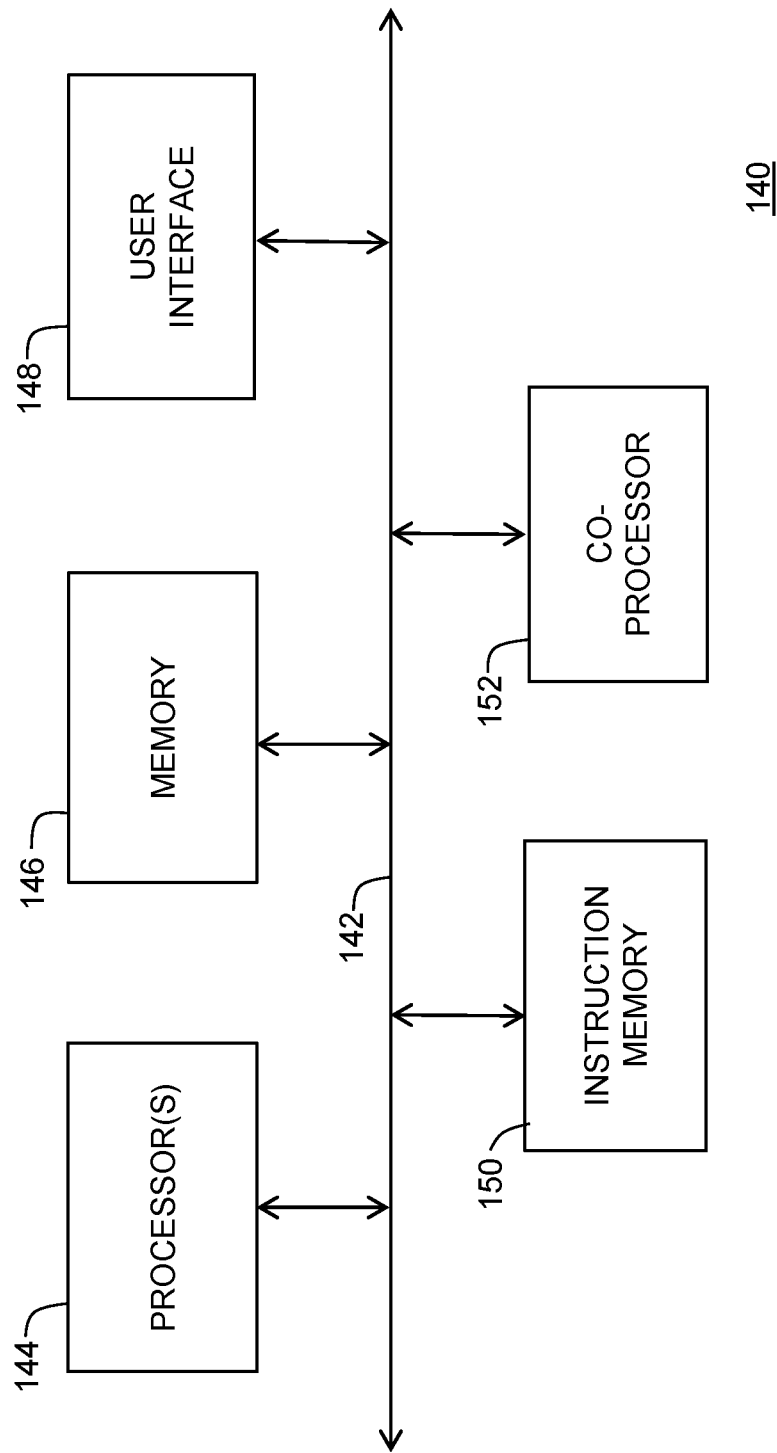
FIG. 6 illustrates a data processing system suitable for implementing the methods of FIGS. 2-5.

FIG. 6 illustrates data processing system 140 suitable for implementing the methods of FIGS. 2-5. Data processing system 140 may be implemented on one or more integrated circuits and may be used in an implementation of the described embodiments. Data processing system 140 may be used in, e.g., an edge node of an internet of things (IoT) device. Data processing system 140 includes bus 142. Connected to bus 142 is one or more processor(s) 144, memory 146, user interface 148, instruction memory 150, and network interface 152. The one or more processor(s) 144 may include any hardware device capable of executing instructions stored in memory 146 or instruction memory 150. For example, processor(s) 144 may execute machine learning algorithms used for training and operating a ML model. Processor(s) 144 may be, for example, a microprocessor, field programmable gate array (FPGA), application-specific integrated circuit (ASIC), or similar device. The guest OS(s) and hypervisor may be implemented in code on processor(s) 144. Processor(s) 144 may be implemented in a secure hardware element and may be tamper resistant.

Memory 146 may be any kind of memory, such as for example, L1, L2, or L3 cache or system memory. Memory 146 may include volatile memory such as static random-access memory (SRAM) or dynamic RAM (DRAM), or may include non-volatile memory such as flash memory, read only memory (ROM), or other volatile or non-volatile memory. Also, memory 146 may be implemented in a secure hardware element. Alternately, memory 146 may be a hard drive implemented externally to data processing system 140. In one embodiment, memory 146 may be used to store hash sets S and T. In another embodiment, memory 146 may be used to store, e.g., weight matrices for the ML model.

User interface 148 may be connected to one or more devices for enabling communication with a user such as an administrator. For example, user interface 148 may be enabled for coupling to a display, a mouse, a keyboard, or other input/output device. Various other hardware or configurations for communicating are available.

Co-processor 152 is bi-directionally connected to bus 142. Co-processor 152 may be a special type of co-processor optimized for running encryption/decryption security software according to the RSA, ECC, or Advanced Encryption Standard (AES) or other type of commonly used encryption algorithm. The algorithm executed on co-processor 152 may be used to encrypt/decrypt data and instructions as provided in the methods 20, 60, 90, and 120.

Instruction memory 150 may include one or more machine-readable storage media for storing program code, or instructions, for execution by processor(s) 144. In other embodiments, both memories 146 and 150 may store data upon which processor(s) 144 may operate. Memories 66 and 70 may also store, for example, encryption, decryption, and verification applications. Memories 66 and 70 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a guest operating system (OS) providing first level address translation (FLAT) and a hypervisor providing second level address translation (SLAT), the hypervisor controlling read, write, and execute access rights of a plurality of memory pages of the data processing system, a method comprising:
generating and storing a set of hashes of all memory pages accessible by the guest OS;
generating and storing a set of hashes of all memory pages previously accessed by the guest OS;
setting, by the hypervisor during an initial state of the data processing system, access rights for the guest OS to read and write for all the memory pages but not execute access rights;
requesting, by the guest OS, execute access to a memory page, wherein the memory page is not set with execute access rights;
generating, by the hypervisor, a first exception in response to the guest OS requesting the execute access to the memory page, without execute access rights;
wherein the first exception comprises:
comparing a hash of the accessed memory page with the set of hashes of the previously accessed memory pages and determining that the hash of the accessed memory page does not match with the set of hashes of the previously accessed memory pages and in response, reporting suspicious behavior of the guest OS;
and comparing the hash of the accessed memory page with the set of hashes of all accessible memory pages and determining that the hash of the accessed memory page does not match with the set of hashes of all accessible memory pages and in response, reporting illegal behavior of the guest OS.

2. The method of claim 1, wherein reporting illegal behavior of the guest OS further comprises withdrawing all access rights to the memory page.

3. The method of claim 1, wherein generating and storing hashes of all memory pages previously accessed by the guest OS further comprises generating and storing the hashes during development of the data processing system.

4. The method of claim 1, further comprising:
requesting, by the guest OS, read or write access to the memory page;
generating, by the hypervisor, a second exception in response to the guest OS requesting the write access to the memory page;
encrypting or erasing the memory page in response to the second exception; and
granting read or write access to the memory page.

5. The method of claim 4, further comprising:
requesting, by the guest OS, execute access to the memory page;
generating, by the hypervisor, a third exception in response to the guest OS requesting the execute access to the memory page;
decrypting the memory page; and
granting execute access to the memory page.

6. The method of claim 4, wherein the memory page is only encrypted when the memory page includes protected code.

7. The method of claim 4, wherein the memory page is used for reading/writing operations and executing operations in an alternating manner.

8. The method of claim 1, wherein the data processing system is implemented as one or more integrated circuits.

9. A method in a data processing system having a guest operating system (OS) providing first level address translation (FLAT) and a hypervisor providing second level address translation (SLAT), the hypervisor controlling read, write, and execute access rights to each of a plurality of memory pages of the data processing system, the method comprising:
setting access rights to a memory page to execute for the guest OS but not to read and write; requesting, by the guest OS, read or write access to the memory page, wherein the memory page does not have either read or write access rights;
receiving a first exception, by the hypervisor, in response to the guest OS requesting the read or write access to the memory page, without read or write access rights;
wherein the first exception comprises:
encrypting the memory page in response to the read or write access request to the memory page;
and setting access rights to the encrypted memory page to read and write but not to execute for the guest OS.

10. The method of claim 9, further comprising:
requesting, by the guest OS, execute access to the memory page;
receiving a second exception, by the hypervisor, in response to the guest OS requesting the execute access to the memory page;
decrypting the memory page in response to the execute request to the memory page; and
setting access rights to the memory page to execute for the guest OS.

11. The method of claim 9, further comprising:
generating and storing a set of hashes of all memory pages accessible by the guest OS;
generating and storing a set of hashes of all memory pages previously accessed by the guest OS;
requesting, by the guest OS, execute access to the memory page;
receiving a second exception, by the hypervisor, in response to the guest OS requesting the execute access to the memory page;
decrypting the memory page in response to the requested execute access to the memory page;
determining if the guest OS had previously accessed the memory page by checking the set of stored hashes of all memory pages previously accessed by the guest OS, wherein if the guest OS had not previously accessed the memory page, reporting suspicious behavior by the guest OS; and
determining if the memory page is accessible by the guest OS by checking the set of stored hashes of all the memory pages accessible to the guest OS, wherein when the memory page is not accessible to the guest OS, reporting illegal behavior of the guest OS, and when the memory page is accessible to the guest OS, granting execute access to the memory page.

12. The method of claim 11, wherein generating and storing the set of hashes of all memory pages previously accessed by the guest OS further comprises generating and storing the set of hashes during development of the data processing system.

13. The method of claim 11, wherein reporting illegal behavior of the guest OS further comprises withdrawing all access rights to the memory page.

14. The method of claim 9, further comprising determining if the memory page contains protected code prior to encrypting the memory page.

15. The method of claim 9, wherein the method is implemented as instructions stored in a non-transitory computer readable medium.

16. A data processing system comprising:
a memory comprising a plurality of memory pages for storing instructions and data;
and a processor coupled to the memory, the processor configured to execute instructions under management of a guest operating system (OS) and a hypervisor, wherein the guest OS provides a first level address translation between a virtual address and an intermediate physical address for a memory page in the plurality of memory pages, and the hypervisor provides a second level address translation between the intermediate physical address and a physical address of the memory page, wherein the guest OS has execute access to the memory page, but read and write access is not permitted, wherein the hypervisor receives a first exception in response to the guest OS requesting read or write access to a memory page, wherein the memory page does not have either read or write access rights;
wherein the first exception comprises:
the memory page is encrypted in response to the read or write access request of the memory page, without read or write access rights, and wherein read or write access is granted to the encrypted memory page and execute access is not permitted.

17. The data processing system of claim 16, wherein the processor further comprises the processor being configured to generate a second exception in response to the guest OS requesting execute access to the memory page, wherein the memory page is decrypted in response to the execute request to the memory page, and wherein the hypervisor grants guest OS access to the memory page.

18. The data processing system of claim 17, wherein the processor is further configured to generate and store in the memory, hashes of all memory pages accessible by the guest OS as a first set, and hashes of all memory pages previously accessed by the guest OS as a second set, wherein the hypervisor generates a third exception in response to the guest OS requesting execute access to the memory page, wherein the memory page is decrypted, the hypervisor determining if the guest OS had previously accessed the memory page by checking the stored hashes of the second set, wherein if the guest OS had not previously accessed the memory page, reporting suspicious behavior by the guest OS, and wherein the hypervisor determining if the memory page is accessible by the guest OS by checking the stored hashes of all the memory pages of the first set, wherein when the memory page being accessed is not accessible to the guest OS, reporting illegal behavior of the guest OS, and when the memory page is accessible to the guest OS, granting execute access to the memory page.

19. The method of claim 16, further comprising the hypervisor configured to determine if the memory page contains protected code prior to encrypting the memory page.

* * * * *